United States Patent
Kanai

(10) Patent No.: US 6,722,737 B2
(45) Date of Patent: Apr. 20, 2004

(54) STRUCTURE OF REVOLVING SEAT

(75) Inventor: Shigeru Kanai, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/360,911

(22) Filed: Feb. 10, 2003

(65) Prior Publication Data
US 2003/0184141 A1 Oct. 2, 2003

(51) Int. Cl.$^7$ ................................................ B60N 2/14
(52) U.S. Cl. ........................ 297/344.22; 297/344.26; 297/473; 248/349.1
(58) Field of Search ...................... 297/344.21, 344.22, 297/344.26, 216.16, 216.18, 473; 248/349.1

(56) References Cited

U.S. PATENT DOCUMENTS

| | | | | |
|---|---|---|---|---|
| 4,705,256 A | * | 11/1987 | Hofrichter | 248/349.1 |
| 4,818,022 A | * | 4/1989 | Nishimura | 297/473 |
| 5,292,179 A | * | 3/1994 | Forget | 297/344.24 |
| 5,653,506 A | * | 8/1997 | Wisner et al. | 297/344.1 |
| 5,785,387 A | * | 7/1998 | Hernandez et al. | 297/473 |
| 6,021,989 A | | 2/2000 | Morita et al. | |
| 6,575,420 B2 | * | 6/2003 | Yoshida et al. | 297/344.22 |

\* cited by examiner

*Primary Examiner*—Peter R. Brown
(74) *Attorney, Agent, or Firm*—Browdy and Neimark, P.L.L.C.

(57) ABSTRACT

A structure of revolving seat including a revolving frame and a pedestal fixed at the side of a floor of vehicle. An anchor unit is provided between the revolving frame and pedestal to prevent breakage of the revolving seat and its associated revolving mechanism. The anchor unit comprises a first anchor element of generally "J" shape including a hole and a projection and a second anchor element of generally "inverted J" shape including a hole and an a projection. When a great load is applied to the revolving seat, the projection of first anchor element is quickly brought to engagement in the hole of second anchor element, while simultaneously, the projection of second element is brought to engagement in the hole of first anchor element. Thus, the great load is immediately transmitted and escaped through the mutually engaged first and second anchor elements to the floor of vehicle.

2 Claims, 3 Drawing Sheets

STRUCTURE OF REVOLVING SEAT

BACKGROUND OF THE INVENTION

1. Field of the Invention

The present invention relates to a revolving seat for use in a vehicle, and in particular to the structure of the revolving seat.

2. Description of Prior Art

A revolving seat is rotatably provided in various vehicles and buses so that the seat may be revolved by 180 degrees about its center of rotation. The revolving seat typically comprises a pedestal fixed on the floor of vehicle and a seat assembly (composed of a seat back and a seat cushion) rotatably mounted on the pedestal via a revolving mechanism or revolving unit. In general, the seat assembly is connected by that revolving unit with the pedestal.

In most cases, a seat belt or particularly a three-point restraining seat belt is provided in this sort of revolving seat. It is therefore of a high likelihood that an excessive great load applied via the seat belt to the seat will result in breakage of the revolving unit.

In the past, to solve such problem, it has been customary to increase the thickness of walls of the revolving unit with a relatively large structure and size. As a consequence thereof, the structure of the revolving unit per se is made complicated and becomes great in weight, which raised costs involved.

SUMMARY OF THE INVENTION

In view of the above-stated drawbacks, it is a primary purpose of the present invention to provide an improved structure of revolving seat which is simplified without requiring complicated structure and without weight increase, while allowing a great load applied from a seat belt to be escaped to a floor of vehicle, thereby preventing damage and breakage of associated revolving mechanism in the seat.

In order to achieve such purpose, in accordance with the present invention, the structure of revolving seat is basically comprised of:

a pedestal means fixedly connected with a floor of vehicle;

a securing frame means;

a revolving frame means securely provided on the securing frame means;

wherein the securing frame means and revolving frame means are rotatably connected with the pedestal means via a revolving mechanism and the revolving frame means is fixedly connected with the seat back frame;

an anchor means provided between the securing frame means and the pedestal means, the anchor means including:

a first anchor means including:
 a securing portion defined at one end thereof;
 a generally J-shaped engagement means defined at another end thereof, said generally J-shaped engagement means including a concavely curved region defined therein and an end;
 a hole defined in the concavely curved region of the generally J-shaped engagement means; and
 a projection formed in the end of the generally J-shaped engagement means; and a second anchor means including:
 a securing portion defined at one end thereof;
 a generally inverted-J-shaped engagement means defined at another end thereof; the generally inverted-J-shaped engagement means including a convexly curved region defined therein and an end;
 a hole formed in said convexly curved region of the generally inverted-J-engagement means, and
 a projection formed in the end of the generally inverted-J-shaped engagement portion;

wherein the securing portion of the first anchor means is securely connected with the securing frame means at a point where at least one seat belt anchor is disposed, while the securing portion of the second anchor means is securely connected with the pedestal means, in such a manner that the projection associated with the first anchor means is normally positioned below and adjacent to the hole associated with the second anchor means, whereas the projection associated with the second anchor means is normally positioned above and adjacent to the hole associated with the first anchor means.

Any other structural features and advantages of the present invention will become apparent from reading of the descriptions hereinafter, with reference to the annexed drawings.

DETAILED DESCRIPTION OF PREFERRED EMBODIMENTS OF THE INVENTION

Figure 1:
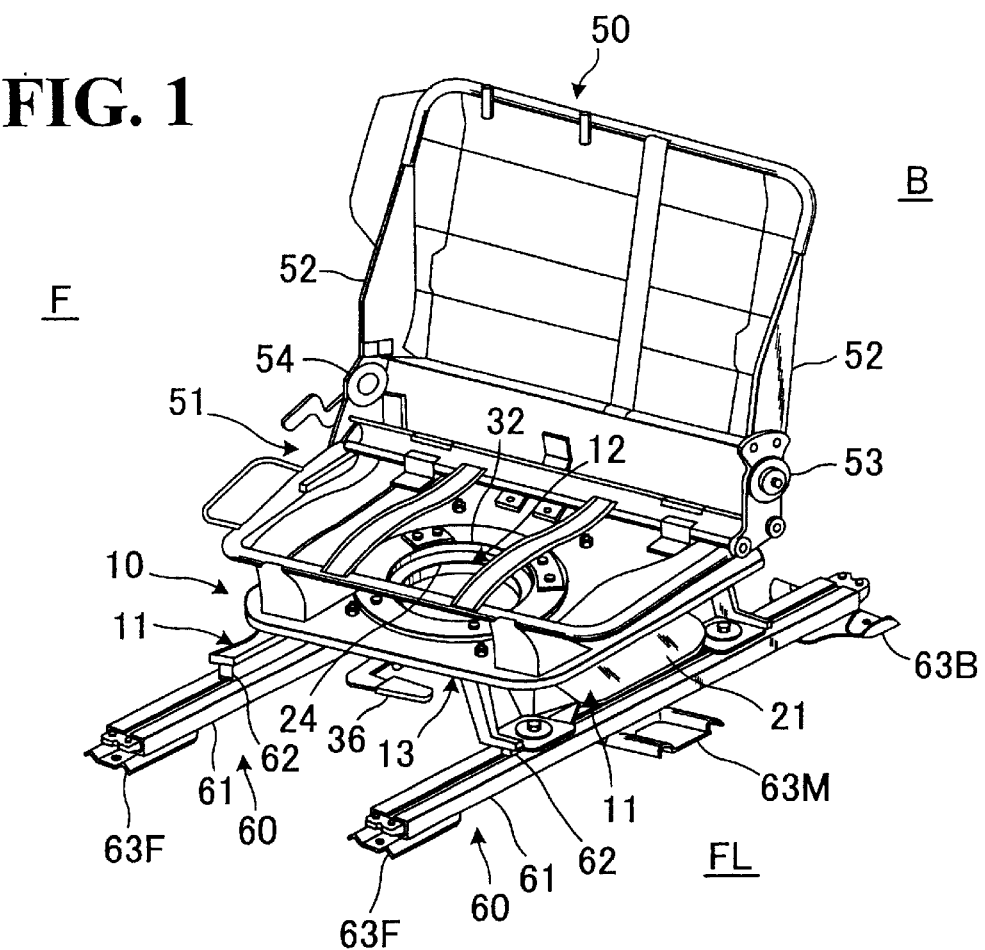
FIG. 1 is a schematic perspective showing a framework of revolving seat to which the present invention is applied.

Referring to FIGS. 1 through 6, there are illustrated exemplary preferred embodiments of structure of revolving seat in accordance with the present invention. As is known, in most cases, a revolving seat is provided as a second seat in a recreational vehicle and the like. FIG. 1 shows one exemplary structure of the revolving seat having a revolving mechanism (10). Designations (50) (51) denote a seat back frame and a seat cushion frame, respectively. As shown, the seat back frame (50) has a pair of lateral frame portions (52) (52) rotatably connected with the seat cushion frame (51) by means of a pair of reclining devices (53) (54), so that the seat back frame (50) is adjustably inclinable relative to the seat cushion fame (51). On the other hand, the seat cushion frame (51) is fixedly mounted on a revolving frame member (13).

The revolving mechanism, generally designated by (10), is provided between the revolving frame member (13) and a pair of slide rail devices (60). The revolving mechanism (10) essentially consists of: a pair of riser members or a pair of pedestals (11) (11); a central plate member (12) fixedly connected with those pair of pedestals (11) (11); and a securing frame member (14) on which the foregoing revolving frame member (13) is fixedly mounted.

Designations (60) (60) denote a pair of slide rail devices, each comprising a lower rail (61) and an upper rail (62) slidably fitted in the lower rail (61). Both of the two slide rail devices (60) are firmly attached on the floor (FL) via a plurality of securing plates (63F) (63M) (63B) as understandable from FIG. 1.

Figure 2:
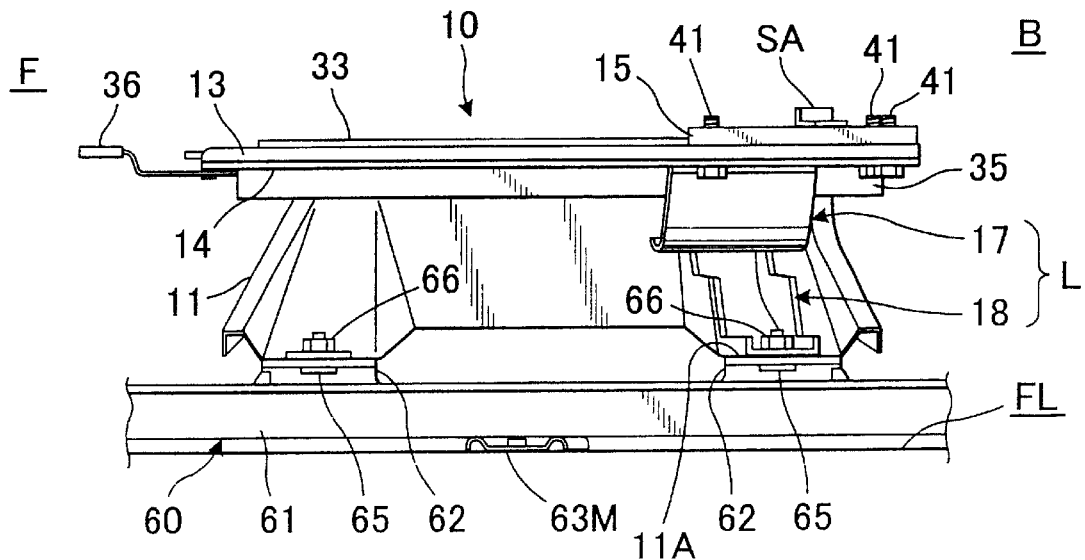
FIG. 2 is a partly broken side elevational view showing a revolving mechanism and principal part of the prevent invention.

As shown in FIGS. 1 and 2, each pedestal (11) has a forward portion facing to a side (F) forwardly of the seat framework and a backward portion facing to a side (B) backwardly of the seat framework. As viewed from FIG. 2, the forward portion of the pedestal (11) is fixedly fastened by the bolt (65) and nut (66) to the forwardly located one of the two slide rail devices (60), while likewise, the backward portion of the pedestal (11) is fixedly fastened by the bolt (65) and nut (66) to the backwardly located one of the two slide rail devices (60). The shown central plate member (12) has a circular hole (24) defined centrally thereof and is formed with a circular groove (26) along the outer peripheral end thereof, the groove (26) being adapted to receive a plurality of balls (27) therein (see FIG. 3). Further, the central plate member (12) has a downwardly extending end portion (25) defined peripherally thereof. While not shown clearly, it should be understood that the downwardly extending end portion (25) extends vertically and continuously from the groove (26) and also extends horizontally in a circular manner relative to the center of the central plate member (12).

Figure 3:
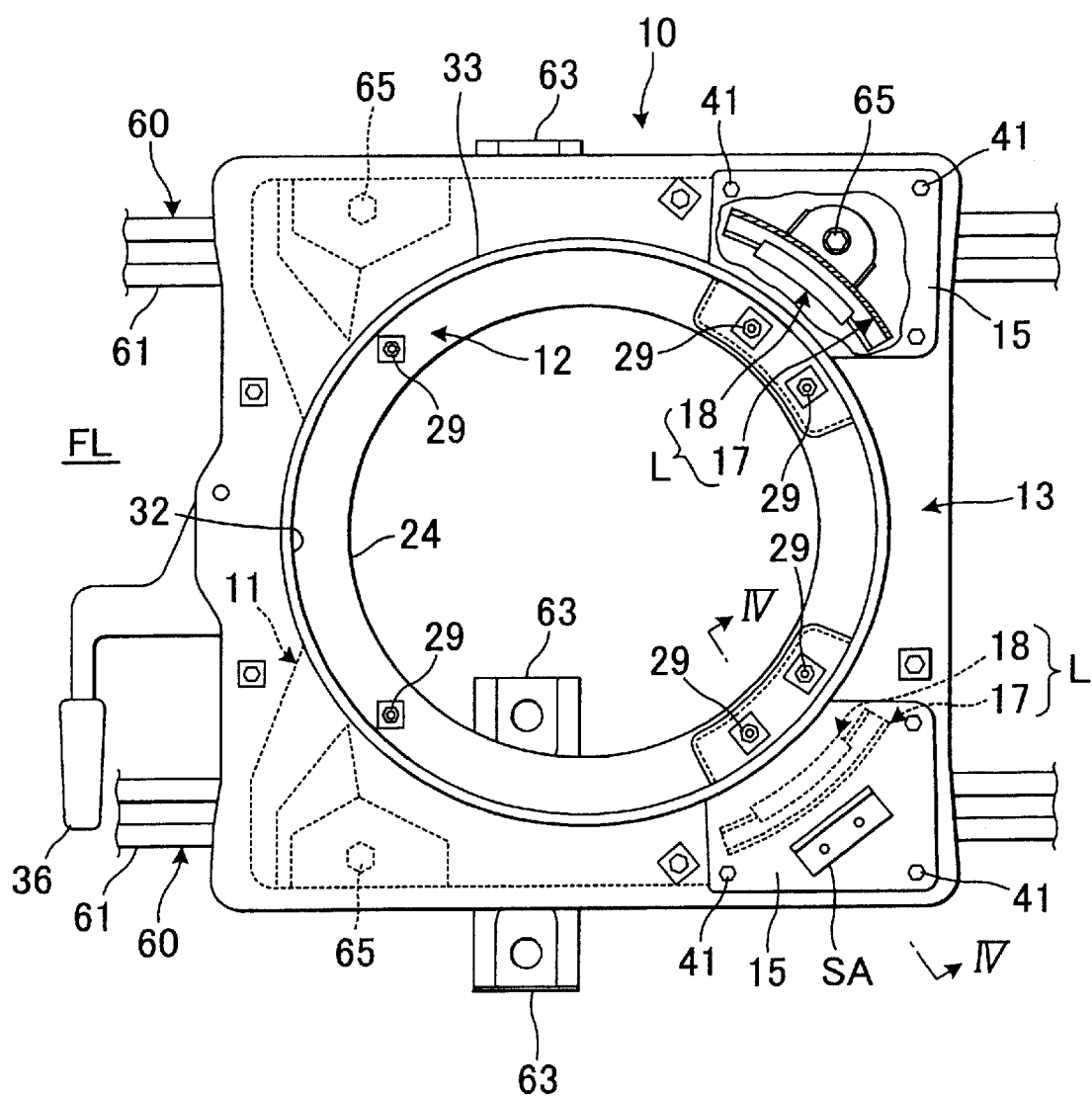
FIG. 3 is a schematic plan view showing the revolving mechanism and principal part of the present invention shown in FIG. 2.

As can be seen from FIGS. 2 and 3, each pedestal (11) has an upper horizontal securing end portion (11B) and a pair of lower spaced-apart horizontal securing end portions (11A) (11A). The upper horizontal securing end portion (11B) of the pedestal (11) is firmly connected with the central plate member (12) by means of securing bolts and nuts (29) (30). On the other hand, the two lower horizontal securing end portions (11A) are firmly connected with the upper rail (62) associated with the slide rail device (60). Hence, it is seen that the central plate member (12) has a firm connection with the slide rail devices (60) through the pedestals (11).

The securing frame member (14) is formed with a circular guide portion (35) of generally U-shaped cross-section. Though not shown, it is to be understood that the guide portion (35) extends along a circle having a center at the center of the securing plate member (14).

The revolving frame member (13) is formed with a circular groove portion (33) along the inward peripheral end thereof, the circular groove portion (33) being adapted to contact the balls (27).

While not clearly shown, as can be understood from FIG. 3, the revolving frame member (13) and securing plate member (14) are firmly connected together by bolts (42) and nuts (43) in such a manner that a plurality of balls (27) are sandwiched between the two grooves (33) (30) respectively of the revolving frame member (13) and central plate member (12), whereas the downwardly extending end portion (25) of the revolving frame member (13) is fitted via a bush (28) in and along the circular guide portion (35) of the securing frame member (14).

With this structure, the revolving frame member (13) is free to rotate or revolve about the central plate member (12). That is, the seat framework consisting of the seat back frame (50) and seat cushion frame (51), which is fixed on that revolving frame member (13), can be revolved about a central axis of the revolving mechanism (10).

Designation (SA) denotes a seat belt anchor. As shown, the seat belt anchor (SA) is fixed on the upper surface of the revolving frame member (13). One end of seat belt (SB) is fixedly connected with the seat belt anchor (SA).

Designation (36) stands for a locking lever adapted to lock and unlock the revolving mechanism (10). As this is well known in the art, further description thereon is omitted. By operating this lever (36), the revolving frame member (13) or the seat framework can be locked at a desired point against rotation and also unlocked from such locked state to allow rotation of the seat framework.

In accordance with the present invention, there is provided an anchor means for allowing the revolving frame member (13) to be lockingly anchored to the pedestals (11).

Reference is first made to FIGS. 2 to 5 which illustrates a first embodiment of such anchor means, According to this embodiment, there are shown a pair of anchor units, each being generally denoted by (L), and they are disposed at a side backwardly of the seat framework and revolving mechanism (10). Each anchor unit (L) comprises: a first anchor element (17) fixedly connected with both revolving frame member (13) and securing frame member (14); and a second anchor element (18) fixedly connected with the pedestal (11).

Since both two anchor units (L) are identical in structure to each other, description hereinafter will be made only about one of them for the sake of simplicity.

Figure 4:
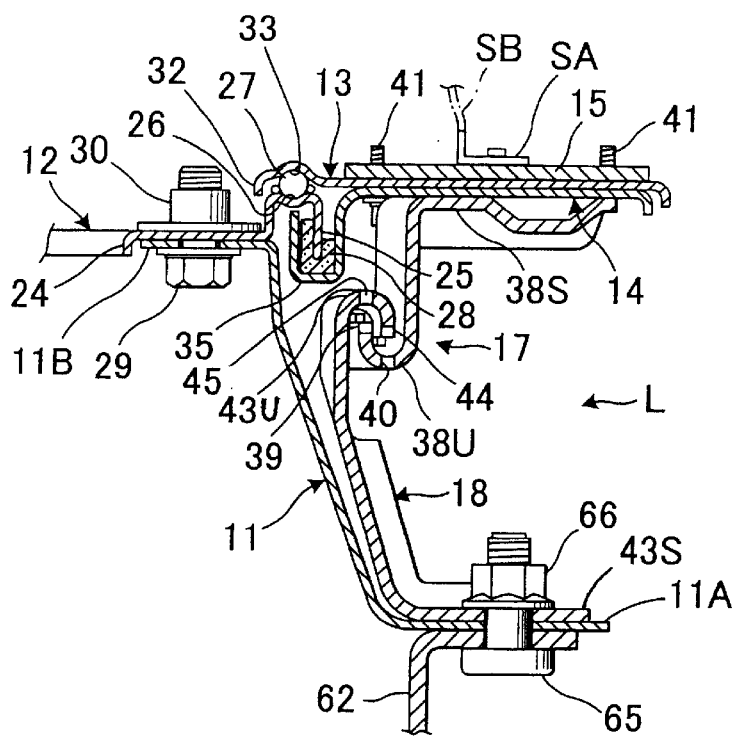
FIG. 4 is a partly broken sectional view showing a first anchor element and a second anchor element which are provided in the revolving mechanism.
Figure 5:
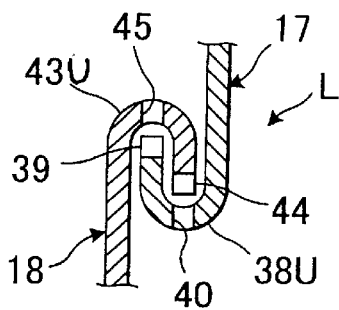
FIG. 5 is a partly broken enlarged sectional view of the first and second anchor elements.

As understandable from FIGS. 3 and 4, in the present embodiment of the anchor unit (L), a whole of the fist anchor element (17) is formed in an arcuate manner. Specifically, the first anchor element (17) is formed from a rigid plate material by press work process into a generally J-shaped configuration including: an upper securing portion (38S) extending horizontally from the upper end thereof as seen in FIG. 4; and a lower engagement portion (38U) having a generally "U" shaped configuration. As shown, though not designated, a vertically extending and arcuately curved portion is defined between those upper securing portion (38S) and lower engagement portion (38U). Therefore, the first anchor element (17) is fixed, at its upper securing portion (38S), to the securing frame member (14) in such a manner that the lower engagement portion (38) thereof are in the state of being pendent from the latter (14). As best shown in FIG. 5, the lower engagement portion (38U) is formed with a female engagement hole (40) in the concavely curved bottom region thereof and also formed with a male engagement projection (39) in the upwardly extending end thereof. As can be seen from FIG. 4 in conjunction with FIG. 3, the lower engagement portion (38U) as well as the whole of first anchor element (17) extend widthwise in arcuate manner along a circle having its center at the center of the central plate member (12).

Likewise, as understandable from FIGS. 3 and 4, a whole of the second anchor element (18) is formed in an arcuate manner. Specifically, the second anchor element (18) is formed from a rigid plate material by press work process into a generally inverted-J-shaped configuration including: a lower securing portion (43S) extending horizontally from one end thereof as seen in FIG. 4; and an upper engagement portion (43U) having a generally inverted-U-shaped cross-section. As shown, though not designated, a vertically extending and arcuately curved portion is defined between those lower securing portion (43S) and upper engagement portion (43U). Hence, the second anchor element (18) is fixed, at its lower securing portion (43S), to the securing portion (11A) of the pedestal (11), with the upper engagement portion (43U) thereof extending upwardly therefrom. As best shown in FIG. 5, the upper engagement portion (43U) has a female engagement hole (45) formed in the convexly curved top region thereof and a male engagement projection (44) formed in the downwardly extending end thereof. As can be seen from FIG. 4 in conjunction with FIG. 3, the upper engagement portion (43U) as well as a whole of the second anchor element (18) extend widthwise in arcuate manner along a circle having its center at the center of the central plate member (12).

As can be observed in FIGS. 4 and 5, the downwardly extending half part (which terminates in the male engagement projection (44)) of the upper engagement portion (43U) is positioned within a generally U-shaped groove defined in the lower engagement portion (38U) and out of contact therewith, while likewise, the upwardly extending half part (which terminates in the female engagement projection (39)) of lower engagement portion (38U) is position within a generally inverted-U-shaped groove defined in the upper engagement portion (43U) and out of contact therewith. It is also observed that the male engagement projection (39) of first anchor element (17) is situated below and adjacent to the female engagement hole (45) of second anchor element (18) and thus out of engagement therein, whereas on the other hand, the male engagement projection (44) of second anchor element (18) is situated above and adjacent to the female engagement hole (40) and thus out of engagement therein.

It is noted that the seat belt anchor (SA) is located at a point above the above-described anchor unit (L) via the revolving and securing frame members (13) (14).

Accordingly, when a great load is applied from the seat belt (SB) and seat belt anchor (SA) to the seat framework (particularly the seat cushion frame (51)) and revolving mechanism (10), tending to pull both revolving and securing frame members (13) (14) in the upward direction, the first anchor element (17) is displaced upwardly, whereupon the two male engagement projections (39) (44) are quickly brought to engagement in the two female engagement holes (45) (40), respectively, thereby locking and anchoring the revolving mechanism (10) to the pedestal (11). Hence, the great load is transmitted through the thus-engaged first and second anchor elements (17) (18) to the upper rails (62) and therefore escaped through the slide rail device (60) to the floor (FL), so that the revolving mechanism (10) is assuredly prevented against damage and breakage due to such great load.

Figure 6:
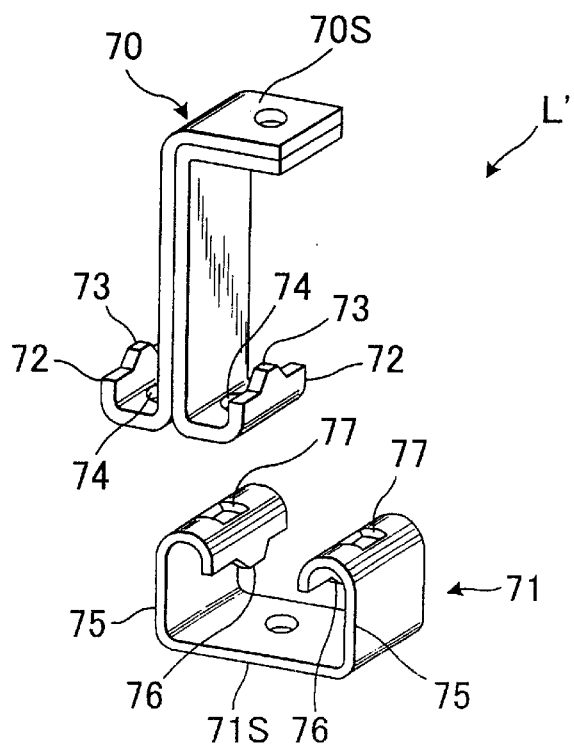
FIG. 6 is a schematic perspective showing another alternative mode of the first and second anchor elements.

FIG. 6 shows another embodiment of anchor unit which is generally designated by (L'). This particular mode of anchor unit (L') comprises a first anchor element (70) formed by a pair of generally J-shaped anchor portions (72) (72) and a second anchor element (71) formed by a pair of inverted-J-shaped anchor portions (75) (75) which are spaced apart from each other as illustrated.

Specifically, the first anchor element (70) has an upper horizontal securing end portion (70S) formed in the vertically extending portion thereof. The two generally J-shaped anchor portions (72) extend outwardly from the opposite sides of the vertically extending portion thereof in a symmetrical manner relative thereto. As shown, each generally J-shaped anchor portion (72) terminates in an end on which a male engagement projection (73) is integrally formed. Designations (74) (74) respectively denote a pair of female engagement holes, each being formed in the concavely curved bottom region of each of the two generally J-shaped anchor portions (72).

The second anchor element (71) has a lower horizontal securing portion (71S). The two generally inverted-J-shaped anchor portions (75) are formed integrally in the two ends of the lower horizontal securing portion (71S), respectively, as shown in FIG. 6. Designations (77) (77) respectively denote a pair of female engagement holes, each being formed in the convexly curved top region of each of the two generally inverted-J-shaped anchor portions (75).

While not shown, the first anchor element (70) may be securely connected, at the upper securing end portion (70S) thereof, with both revolving and securing frame members (13) (14) by means of bolt and nut in such a manner as to be pendent therefrom. Also, the second anchor element (71) may be securely connected, at the lower horizontal securing portion (71S) thereof, with the horizontal securing portion (11A) of pedestal (11) by means of the bolt (65) (66). In that case, it should be arranged that the two male engagement projections (73) associated with the first anchor element (70) are normally disposed below and adjacent to the two female engagement holes (77) and thus out of engagement therein, respectively.

Accordingly, it is to be appreciated that, when a great load is applied from the seat belt (SB) and seat belt anchor (SA) to the seat framework and revolving mechanism (10), tending to pull both revolving and securing frame members (13) (14) in the upward direction, the first anchor element is displaced upwardly, whereupon the two male engagement projections (73) are quickly brought to engagement in the two female engagement holes (77), respectively, while simultaneously, another two male engagement projections (76) are quickly brought to engagement in another two female engagement holes (74), thereby positively locking and anchoring the revolving mechanism (10) to the pedestal (11). Hence, the great load is transmitted through the firmly and mutually engaged first and second anchor elements (70) (71) to the upper rails (62) and escaped through the slide rail device (60) to the floor (FL), so that the revolving mechanism (10) is assuredly prevented against damage and breakage due to such great load.

In accordance with the present invention, the following advantages are therefore attained:

(i) The revolving frame member (13) may be firmly anchored via the above-constructed anchor unit (L or L') to the pedestal (11) at a point where the seat belt anchor (SA) is located, whereby a great load applied to the revolving mechanism (10) form the seat belt (SB) is quickly transmitted through the anchor unit (L or L') to the pedestal (11) and escaped through the slide rail devices (60) to the floor (F). Thus, the revolving mechanism (10) is assuredly prevented against damage and breakage. Also, two-point or three-point restrain seat belts may be provided in the revolving seat.

(ii) Simple provision of the anchor unit (L or L') eliminates any special complicated reinforcement structure which will result in undesired large size and weight increase of the revolving mechanism (10).

It should be understood that the present invention is not limited to the illustrated embodiment, but any other modification, replacement and addition may be applied thereto without departing from the scopes of the appended claims.

What is claimed is:

1. A structure of revolving seat in combination with a floor of vehicle, in which the revolving seat includes a seat cushion frame and at least one seat belt, comprising:

a pedestal means fixedly connected with said floor;

a securing frame means;

a revolving frame means securely provided on said securing frame means;

wherein said securing frame means and said revolving frame means are rotatably connected with said pedestal means via a revolving mechanism and said revolving frame means is fixedly connected with said seat cushion frame;

an anchor means provided between said securing frame means and said pedestal means, said anchor means including:

a first anchor means including:
  a securing portion defined at one end thereof;
  a generally J-shaped engagement means defined at another end thereof, said generally J-shaped engagement means including a concavely curved region defined therein and an end;
  a hole defined in said concavely curved region of said generally J-shaped engagement means; and
  a projection formed in said end of the generally J-shaped engagement means; and a second anchor means including:
  a securing portion defined at one end thereof;
  a generally inverted-J-shaped engagement means defined at another end thereof; said generally inverted-J-shaped engagement means including a convexly curved region defined therein and an end;
  a hole formed in said convexly curved region of the generally inverted-J-engagement means; and
  a projection formed in said end of the generally inverted-J-shaped engagement portion;

wherein said securing portion of said first anchor means is securely connected with said securing frame means at a point where said at least one seat belt anchor is disposed, while said securing portion of said second anchor means is securely connected with said pedestal means in such a manner that said projection associated with said first anchor means is normally positioned below and adjacent to said hole associated with said second anchor means, whereas said projection associated with said second anchor means is normally positioned above and adjacent to said hole associated with said first anchor means.

2. The structure of revolving seat as claimed in claim 1, wherein said generally J-shaped engagement means of said first anchor means comprises: a vertically extending portion defined between said one end and said another end; and a pair of generally J-shaped engagement portions which are defined at said another end in such a manner as to extend outwardly from and symmetrically relative to said vertically extending portion, wherein, in each of said pair of generally J-shaped engagement portion, there are defined said concavely curved region, said hole and said projection, wherein said generally inverted-J-shaped engagement means of said second anchor means comprises a pair of generally inverted-J-shaped engagement portions which are defined in the securing portion thereof in such manner as to extend upwardly from and symmetrically relative to the securing portion, wherein in each of said pair of generally inverted-J-shaped engagement portions, there are defined said convexly curved region, said hole, and said projection, and wherein said projection associated with each of said pair of generally J-shaped engagement portions is normally positioned below and adjacent to said hole associated with each of said pair of generally inverted-J-shaped engagement portions and out of engagement therein, whereas said projection associated with each of said pair of generally inverted-J-shaped engagement portions is normally positioned above and adjacent to said hole associated with each of said generally J-shaped engagement portions.

* * * * *